United States Patent [19]
Yang et al.

[11] Patent Number: 5,684,086
[45] Date of Patent: Nov. 4, 1997

[54] CURED THERMOSETS AND GLASS-REINFORCED COMPOSITES FROM UNSATURATED POLYETHERESTER RESINS

[75] Inventors: Lau S. Yang, Wilmington, Del.; Keith G. Johnson, Wayne, Pa.

[73] Assignee: ARCO Chemical Technology, Inc., Greenville, Del.

[21] Appl. No.: 508,602

[22] Filed: Jul. 28, 1995

[51] Int. Cl.$^6$ .................. C08G 63/48; C08G 63/91; C08L 67/00

[52] U.S. Cl. .............. 525/49; 525/42; 523/527; 524/513

[58] Field of Search .................. 525/42, 43, 49, 525/44; 523/527; 524/513, 492, 493, 494, 409, 414, 437, 275, 278, 425, 451, 433, 436

[56] References Cited

U.S. PATENT DOCUMENTS

| | | | |
|---|---|---|---|
| H521 | 9/1988 | Fan | 525/391 |
| 2,671,070 | 3/1954 | Knapp | 260/45.4 |
| 2,870,112 | 1/1959 | Mertzweiller | 260/33.6 |
| 3,347,806 | 10/1967 | Zimmermann | 260/22 |
| 3,883,617 | 5/1975 | Pratt et al. | 260/862 |
| 3,933,757 | 1/1976 | Pratt et al. | 260/75 |
| 4,029,848 | 6/1977 | Nelson | 428/430 |
| 4,148,765 | 4/1979 | Nelson | 260/22 |
| 4,246,367 | 1/1981 | Curtis, Jr. | 525/49 |
| 4,348,499 | 9/1982 | Nelson | 525/49 |
| 4,522,977 | 6/1985 | Gardner | 525/48 |
| 4,710,420 | 12/1987 | Tonoki et al. | 428/212 |
| 4,990,397 | 2/1991 | Tsunemi et al. | 428/246 |
| 5,319,006 | 6/1994 | Yang et al. | 523/500 |
| 5,436,313 | 7/1995 | Klang et al. | 528/274 |
| 5,436,314 | 7/1995 | Yang et al. | 528/274 |

*Primary Examiner*—George F. Lesmes
*Assistant Examiner*—U. K. Rajguru
*Attorney, Agent, or Firm*—Jonathan L. Schuchardt

[57] ABSTRACT

Polymer blends of unsaturated polyetherester resins and dicyclopentadiene polyester resins give single-phase, cured thermosets having high tensile and flexural strength. The thermosets exhibit a single glass-transition temperature within the range of about 70° C. to about 150° C. The synergism resulting from polymer blending provides a cost-effective way to improve the strength properties of cured polyetherester thermosets, and coincidentally, gives a way to improve the flexibility and toughness of cured DCPD polyester thermosets. Glass-reinforced thermosets made from polyetherester resin blends show exceptional structural fatigue resistance.

20 Claims, No Drawings ness. Glass-reinforced thermoset composites of the invention have exceptional structural fatigue properties.

CURED THERMOSETS AND GLASS-REINFORCED COMPOSITES FROM UNSATURATED POLYETHERESTER RESINS

FIELD OF THE INVENTION

The invention relates to cured thermoset polymers. In particular, the invention relates to cured thermosets made from polymer blends of dicylopentadiene polyester resins and unsaturated polyetherester resins. The cured thermosets are single-phase systems that have excellent strength and flexibility. Glass-reinforced thermoset composites of the invention have exceptional structural fatigue properties.

BACKGROUND OF THE INVENTION

Cured thermoset polymers are commonly made by reacting an unsaturated polyester resin with a vinyl monomer in the presence of a free-radical initiator. Fiberglass, mineral fillers, and/or other reinforcing materials are often included in the formulations to overcome brittleness and provide dimensional stability and toughness. Thermosets and glass-reinforced composites based on unsaturated polyester resins are used in many key industrial applications, including construction, land transportation, marine, and corrosion-resistant products.

Recently, we described new unsaturated polyetherester resins that are also useful in making cured thermosets. The polyetherester resins are made by reacting polyether polyols and unsaturated anhydrides or dicarboxylic acids in the presence of an insertion catalyst, i.e., a Lewis acid, a strong protic acid, or a salt of a strong protic acid (see U.S. Pat. Nos. 5,319,006, 5,436,313 and 5,436,314). The anhydride inserts randomly into the polyether chain, resulting in a polyetherester product. The degree of unsaturation in the product is easily controlled by varying the relative proportions of polyether polyol and cyclic, unsaturated anhydride. These polyetheresters can be cured as conventional unsaturated polyesters; the unsaturated polyetherester resin is simply heated with a vinyl monomer, usually styrene, and a free-radical initiator under conditions effective to produce a cured polyetherester product. The cured polyetherester product often has good strength and flexibility compared with conventional cured polyesters because of the presence of polyether moieties.

For some applications, the usefulness of cured polyetherester products is limited by their inherent flexibility. A product with greater stiffness, i.e., higher tensile and flexural modulus properties, is sometimes needed. One way to accomplish this result is to blend in a second, high-modulus resin, compatible with the first resin, that will provide a cured product with higher overall stiffness compared with a polyetherester alone.

Dicyclopentadiene (DCPD) polyester resins are relatively rigid resins made by reacting dicyclopentadiene, ethylenically unsaturated dicarboxylic acids, and compounds having two groups each containing a reactive hydrogen atom reactive with carboxylic acid groups. The acid may be obtained from the corresponding anhydride and water. DCPD polyesters made from DCPD, maleic anhydride, water, and a glycol such as propylene glycol, in particular, are widely used resins (about 300 MM lbs./yr.) because they provide acceptable properties and they are relatively cheap. In addition to the economic benefit, DCPD polyester resins offer low shrinkage, corrosion resistance, moisture resistance, and good high-temperature performance. A key disadvantage of DCPD polyester resins is their brittleness.

Tonoki et al. (U.S. Pat. No. 4,710,420) describe unsaturated polyetherester compositions which comprise a hard unsaturated polyester component (which may be a DCPD polyester resin), a soft polyetherester component (which contains polyoxyalkylene groups), and a crosslinking monomer. The soft polyetherester is dispersed as fine particles within the hard polyester, giving a two-phase blend. A cured, unsaturated polyetherester thermoset from the blend exhibits two glass-transition temperatures. The heterogeneity of the blend prevents possible synergism between the hard polyester and soft polyetherester resin components. Similar compositions are disclosed in U.S. Pat. No. 4,990,397 (Tsunemi et al.), which describes electrical laminates made from blends of hard polyester and soft unsaturated polyetherester resins. Neither reference describes single-phase polyetherester resin blends or cured thermosets that exhibit one glass-transition temperature.

Because DCPD polyester resins are generally stiffer than polyetherester resins, one might expect that a blend of a polyetherester and a DCPD polyester resin, if compatible, would produce cured products with physical properties of intermediate value compared with properties of products made from either of the two resins alone. A 50/50 blend of a polyetherester resin and a DCPD polyester resin, for example, should give a cured product having static physical properties (tensile modulus, tensile strength, flexural modulus, and flexural strength) that are about equal to an average value of the properties observed when either resin is used alone to make the cured product. Stronger products should be available from glass reinforcement.

In addition to having good static physical properties, cured thermoset polymers and composites should resist structural fatigue. Structural fatigue occurs in normal use when composite materials are repeatedly stressed with cyclic loading and unloading of forces. Fatigue resistance is evaluated by cyclic fatigue testing in which a tensile bar sample is repeatedly stressed and unstressed until it fails. Higher "cycles-to-failure" indicates better fatigue resistance.

Still needed in the art are cost-effective ways to make polyetheresters having higher stiffness and greater strength. Also needed are ways to impart much-needed toughness to DCPD polyester resins. Of particular interest are cured thermosets and glass-reinforced composites that have improved structural fatigue properties.

SUMMARY OF THE INVENTION

The invention is a cured thermoset which comprises the reaction product of a vinyl aromatic monomer, a free-radical initiator, and a polymer blend. The polymer blend comprises a single phase and contains from about 1 to about 99 wt.% of an unsaturated polyetherester resin, and from about 1 to about 99 wt.% of a dicyclopentadiene (DCPD) polyester resin. The thermoset exhibits a single glass-transition temperature within the range of about 70° C. to about 150° C. The invention includes thermoset composites made by reacting the vinyl aromatic monomer, free-radical initiator, and polymer blends in the presence of a reinforcing filler such as fiberglass.

We surprisingly found that the static physical properties of cured thermosets made from polyetherester/DCPD polyester resin blends are substantially higher than those of thermosets made from either polymer alone. The synergism resulting from polymer blending provides a cost-effective way to improve the stiffness and strength properties of polyetherester thermosets, and coincidentally offers a way to improve the flexibility and toughness of DCPD polyester thermosets.

We also surprisingly found that the fatigue resistance properties of thermoset composites of the invention, especially glass-reinforced composites, far exceed those of thermoset composites made from commercially available DCPD-based or general-purpose (orthophthalic) polyester resins.

DETAILED DESCRIPTION OF THE INVENTION

Unsaturated polyetherester resins are used in the polymer blends and cured thermosets of the invention. By "unsaturated polyetherester resin" we mean polymer resins of intermediate molecular weight that contain ethylenic unsaturation available for free-radical polymerization with a vinyl monomer, recurring ester units, and recurring polyether blocks. The polyether blocks will have, on average, from 3 to 6 oxyalkylene (e.g., oxypropylene, oxyethylene) units. Unsaturated polyetherester resins useful in the invention are characterized by an ether/ester ratio greater than that found in conventional unsaturated polyesters. We believe that the ether blocks in these resins help to enhance the strength and fatigue properties of cured thermosets and reinforced composites made from the resins. Generally, the resins will have an ether/ester mole ratio of at least about 0.75. Preferred resins will have ether/ester mole ratios within the range of about 1 to about 3. The resins, which will have alcohol or carboxylic acid end groups, will generally have number average molecular weights within the range of about 500 to about 10,000.

Suitable unsaturated polyetherester resins include the reaction products of polyethers and unsaturated anhydrides or unsaturated di- or polycarboxylic acids. U.S. Pat. No. 5,319,006, the teachings of which are incorporated herein by reference, describes one process for making these unsaturated polyetherester resins. A polyether, such as a polyether polyol, reacts with a cyclic, unsaturated anhydride (such as maleic anhydride) in the presence of a Lewis acid catalyst. The anhydride inserts randomly into the polyether chain to give an unsaturated polyetherester resin. Suitable polyethers, cyclic unsaturated anhydrides, and Lewis acid catalysts for making the unsaturated polyetherester resins are described in the reference. Example A, below, illustrates this process.

U.S. Pat. Nos. 5,436,313 and 5,436,314, the teachings of which are incorporated herein by reference, describe additional insertion methods for preparing suitable unsaturated polyetherester resins. These patents teach the use of protic acids having a pKa less than about 0 and metal salts thereof as catalysts for randomly inserting anhydrides and dicarboxylic acids into polyethers to make polyetherester resins. Preferred unsaturated polyetherester resins are made by insertion of anhydrides or dicarboxylic acids into polyethers.

Suitable unsaturated polyetherester resins can also be prepared by condensation polymerization using techniques that are commonly known for making unsaturated polyester resins. The invention requires a polyetherester resin, however, so one or more polyoxyalkylene compounds must be included to produce a resin that has polyether blocks having an average of from 3 to 6 oxyalkylene units. A suitable unsaturated polyetherester resin for use in the cured thermosets of the invention can be made, for example, by reacting maleic anhydride (35 wt.%), a polyoxypropylene diol of 400 molecular weight (43 wt.%), and propylene glycol (22 wt.%) to produce an unsaturated polyetherester resin having a number average molecular weight of about 2000, an average of 3 oxyalkylene units in the polyether block, and ether/ester ratio of 1.

Dicyclopentadiene (DCPD) polyester resins are also used in the polymer blends and cured thermosets of the invention. DCPD polyester resins are well-known rigid resins made by reacting dicyclopentadiene, maleic anhydride, water, and a glycol (usually propylene glycol, ethylene glycol, diethylene glycol, dipropylene glycol, or mixtures of these). The process is performed under conditions effective to first generate maleic acid and form dicyclopentadiene maleate; the maleate ester is then esterified with the glycol and isomerized during the latter stages of the reaction.

Any desired type or grade of DCPD polyester resin can be used in the polymer blends and cured thermosets of the invention. Suitable resins are commercially available from many suppliers, including, for example, GLS Fiberglass (Woodstock, Ill.). The preparation of DCPD polyester resins is described, for example, in U.S. Pat. Nos. 3,933,757, 3,347,806, 3,883,612, 4,029,848, 4,148,765, 4,348,499, and 4,246,367, the teachings of which are incorporated herein by reference.

Polymer blends of the invention are prepared by combining an unsaturated polyetherester resin and a DCPD polyester resin. Because DCPD polyester resins are generally available as solutions in styrene, blending is usually accomplished by mixing styrene solutions of the resins. Vinyl aromatic monomers other than styrene (e.g., vinyl toluene, chlorostyrenes, chlorotoluenes, etc.) can be used instead of or in addition to styrene, but styrene is generally preferred. The polymer blend solutions can be used immediately to make a cured thermoset by adding a free-radical initiator. If desired, the solution can be stored until needed; in this case, it is preferred to add a free-radical inhibitor (p-benzoquinone, hydroquinone, methoxyphenol, BHT, phenothiazine, or the like, or mixtures of these) to the solution to prevent polymerization and promote storage stability. Blending of the polymers can also be accomplished in the absence of a solvent by heating and mixing the polymers at a temperature effective to produce a molten mixture.

The unsaturated polyetherester resin and the DCPD polyester resin can be used in any desired relative proportion. Blends of these polymers generally give cured thermosets having better tensile and flexural strengths compared with the strength properties of cured thermosets made from either the unsaturated polyetherester or the DCPD resin alone. Polymer blends of the invention generally comprise from about 1 to about 99 wt.% of an unsaturated polyetherester resin and from about 1 to about 99 wt.% of a dicyclopentadiene unsaturated polyester resin. More preferred polymer blends comprise from about 25 to about 75 wt.% of the unsaturated polyetherester resin and from about 25 to about 75 wt.% of the DCPD unsaturated polyester resin. Most preferred are polymer blends which comprise from about 40 to about 60 wt.% of the unsaturated polyetherester resin and from about 40 to about 60 wt.% of the DCPD unsaturated polyester resin.

Cured thermosets of the invention are made by reacting the polymer blends with a vinyl aromatic monomer in the presence of a free-radical initiator. Vinyl aromatic monomers useful in the invention include styrene, vinyl toluene, chlorostyrenes, tert-butylstyrene, dimethylstyrenes, divinylbenzene, and the like, and mixtures thereof. Styrene is particularly preferred. The vinyl aromatic monomer is used in an amount effective to give a cured thermoset when reacted with the polymer blend in the presence of a free-radical initiator. Preferably, the amount of vinyl aromatic monomer used is within the range of about 10 to about 70 wt.% based on the amount of cured thermoset. A more preferred range is from about 20 to about 60 wt.%; most preferred is the range from about 30 to about 50 wt.%.

Useful free-radical initiators are those well known in the unsaturated polyester industry, and include peroxide and azo-type initiators. Peroxide initiators are preferred because of their lower cost. Suitable peroxide initiators include, for example, methyl ethyl ketone peroxide, benzoyl peroxide, tert-butyl perbenzoate, tert-butylperoxide, and the like, and mixtures thereof. The initiator is used in an amount effective to react the vinyl aeromatic monomer and polymer blend to produce a cured thermoset. Typically, the amount is within the range of about 0.5 to about 3 wt.% based on the amount of thermoset prepared; a more preferred range is from about 1 to about 2 wt.%.

An accelerator is often used in addition to the free-radical initiator to allow curing at lower temperatures. Examples of these accelerators, which are well known in the art, include dimethyl aniline and salts of transition metals (cobalt, iron, manganese, copper, zinc, or vanadium), such as cobalt naphthenate, cobalt octanoate, and the like.

The cured thermosets are made by reacting the polymer blend, vinyl aromatic monomer, and free-radical initiator under conditions effective to produce a cured thermoset. As shown in Examples 2–5, the thermosets can be made by curing at room temperature in the presence of MEK peroxide and cobalt naphthenate. If desired, the catalysis can be adjusted to allow the curing reaction to be performed at elevated temperatures. After the initial curing reaction is complete, the product is optionally post-cured at elevated temperature (100° C. to 140° C.) to more rapidly achieve ultimate physical properties.

Optionally, various additives are included in the cured thermosets of the invention. The additives may comprise a major portion of the cured thermoset. Reinforcing agents such as glass fabrics, chopped glass, or organic fibers can be included. Other additives include fire retardants (phosphorus or antimony compounds, alumina trihydrate, halogenated waxes, etc.), pigments, colorants, mold release agents, inert fillers (calcium carbonate, clays, talc, etc.), low-profile or low-shrink additives, thickeners (magnesium oxide, magnesium hydroxide, calcium oxide, etc.), and the like.

Because DCPD polyester resins are relatively inexpensive, the invention provides a way to enhance the stiffness and strength of cured thermosets made predominantly with polyetherester resins by blending in enough DCPD polyester resin to enhance these properties. Strength properties generally continue to improve until the amounts of DCPD polyester resin and polyetherester resin are about equal. Viewed from a different angle, the invention provides a way to impart much-needed flexibility to thermosets made with mostly DCPD polyester resins. Blending in some unsaturated polyetherester resin with conventional DCPD polyester resins makes the thermosets much more flexible and overcomes the problem of brittleness, currently a key disadvantage of thermosets made from DCPD polyester resins alone.

The invention includes glass-reinforced thermoset composites. These are made by reacting a vinyl aromatic monomer, a free-radical initiator, and an unsaturated polyetherester resin in the presence of a glass reinforcing filler. Preferably, a blend of an unsaturated polyetherester resin and a dicyclopentadiene resin is used to make the composite. The glass filler can be in any desired form, such as chopped glass, fiberglass, glass mat, or the like. The amount of glass used in the thermoset composite depends on the intended use. Generally, the amount of glass used is within the range of about 5 to about 80 wt.% based on the amount of thermoset composite. A more preferred range is from about 10 to about 60 wt.%. Glass-reinforced thermoset composites made from polyetherester resin blends show exceptional structural fatigue resistance, as is shown below in Examples 6–10 and Table 2.

The following examples merely illustrate the invention. Those skilled in the art will recognize many variations that are within the spirit of the invention and scope of the claims.

EXAMPLE A

Preparation of an Unsaturated Polyetherester Resin

A 4-liter resin reactor is charged with ARCOL 16–52 polyol (PO-based polyether triol that includes 10% of ethylene oxide recurring units, hydroxyl number=52 mg KOH/g, 2150 g), maleic anhydride (931 g), 50% phosphoric acid (490 mg), and zinc chloride (31 g). The reaction mixture is heated at 175° C. for 11 h until the acid number drops to 145 mg KOH/g. Propylene glycol (315 g) is added, and the mixture is heated to 185° C. for 4 h until the acid number drops to 50 mg KOH/g. The product is cooled to about 100° C. and is mixed with styrene to give a solution containing about 60 wt.% polyetherester resin and about 40 wt.% styrene. Hydroquinone (100 ppm) and methoxyphenol (100 ppm) are added to stabilize the resin solution.

EXAMPLES 1–5

Preparation of Cured Thermosets

The polyetherester resin/styrene solution of Example A is mixed with a commercial dicyclopentadiene polyester resin (obtained from GLS Fiberglass, Woodstock, Ill.) to form polymer blends having the resin proportions shown in Table 1. To each solution is added 0.3% cobalt naphthenate (6% Co) and 1% methyl ethyl ketone peroxide solution (Atochem DDM-9 peroxide). The mixtures are then poured into glass molds and cured overnight at room temperature. The samples are post-cured at 100° C. for 3 h. The physical properties of the cured thermosets, as measured by ASTM procedures D638 and D790, appear in Table 1.

As shown in the table, the tensile and flexural modulus properties increase almost linearly with the proportion of DCPD resin in the blend. This result is predicted from the tensile and flexural modulus values of thermosets from either the polyetherester or DCPD resin alone.

The tensile and flexural strengths (stress at break) of cured thermosets based on the blends, however, are much higher than expected based on the strengths of the thermosets made from either unblended polymer. In fact, a 50/50 blend of the polymers gives a 68% increase in flexural strength compared with the DCPD resin, and a 52% increase compared with the polyetherester resin. The improvement in tensile strength of the 50/50 blend is also remarkable: tensile strength increases 44% compared with the DCPD resin, and 92% compared with the polyetherester resin. Synergism between the two types of resins results in unexpectedly high strength properties for the cured thermosets made from DCPD/polyetherester blends.

EXAMPLES 6–10

Preparation of Glass-Reinforced Thermosets

Laminate panels are constructed using conventional hand lay-up techniques and the following resin samples: (1) unsaturated polyetherester resins (PEER resins) prepared as in Example A; (2) a commercially available DCPD-based polyester marine resin; (3) blends of the PEER resins and DCPD-based polyester resins; and (4) a commercially available general-purpose orthophthalic marine resin. The resins are promoted with 0.2–0.5 wt.% cobalt naphthenate (6%), 0.3 wt.% dimethylaniline, or already contain the manufacturer's promoter (the ortho resin). The promoted resins are catalyzed with 1.5 wt.% methyl ethyl ketone peroxide (Atochem DDM-9 peroxide).

The laminate panels consist of three plies of 2 oz/ft$^2$ chopped strand mat (CSM). The laminates are allowed to cure overnight under ambient conditions before removing them from the flat mold surface. The sections are set aside for seven days prior to preparations for testing.

Test coupons are cut from the laminates, and are post-cured at 40° C. (104° F.) for 6 h prior to mechanical testing.

As Examples 6–10 show, glass-reinforced thermoset composites made from polyetherester resin blends have exceptional structural fatigue resistance. Compared with commercially available DCPD and orthophthalic-based marine resins, the polyetherester resins and polyetherester/DCPD resin blends surprisingly give superior glass-reinforced composites. For example, while the commercial samples fail after 4000 to 9000 cycles at a load equal to 75% of maximum stress, the polyetherester thermoset composites survive 20,000 to 540,000 cycles under the same conditions. The improvement in structural fatigue properties is unexpected, particularly in view of the relatively similar static physical properties (tensile strength, flexural strength) of these composites (see Table 2).

The preceding examples are meant as illustrations; the following claims define the scope of the invention.

TABLE 1

Physical Properties of Polyetherester/Dicyclopentadiene Thermosets

| Ex. # | Wt. % PEER[1] resin in PEER/DCPD blend | Tensile modulus (kpsi) | Flexural modulus (kpsi) | Tensile stress at break (kpsi) | Flexural stress at break (kpsi) |
|---|---|---|---|---|---|
| C1 | 0 | 521 | 574 | 6.5 | 10.4 |
| 2 | 25 | 478 | 521 | 7.3 | 15.0 |
| 3 | 50 | 432 | 453 | 9.4 | 17.4 |
| 4 | 75 | 365 | 375 | 6.5 | 13.4 |
| C5 | 100 | 299 | 324 | 4.9 | 11.4 |

[1]PEER = polyetherester resin prepared as in Example A.
DCPD = commercially available dicyclopentadiene-based polyester resin for marine applications.

TABLE 2

Physical Properties of Glass-Reinforced Thermosets

| Ex. # | Resin | Tensile strength (kpsi) | Flexural strength (kpsi) | Fatigue Resistance[2] (Thousands of Cycles to Failure) | |
|---|---|---|---|---|---|
| | | | | 60% stress | 75% stress |
| 6 | PEER/DCPD (25/75) | 10.3 | 19.6 | 8,943 | 20 |
| 7 | PEER/DCPD (50/50) | 11.1 | 17.9 | 12,575 | 547 |
| 8 | PEER (100%) | 11.6 | 17.5 | 10,343 | 92 |
| C9 | DCPD | 9.7 | 17.2 | 1,655 | 4 |
| C10 | Orthophthalic | 10.3 | 18.2 | 6,135 | 9 |

[1]PEER = polyetherester resin prepared as in Example A.
DCPD = commercially available dicyclopentadiene-based polyester resin for marine applications.
Orthophthalic = general-purpose orthophthalic marine resin.
[2]Fatigue resistance is measured by stretching a laminate bar (1" × 8") repeatedly (30/cycles/sec) with a stress equal to 60% (or 75%) of the maximum tensile stress at break. The number of cycles to failure are noted above.

We claim:

1. A cured thermoset which comprises the reaction product of a vinyl aromatic monomer, a free-radical initiator, and a polymer blend, wherein the polymer blend comprises a single phase and contains from about 1 to about 99 wt.% of an unsaturated polyetherester resin and from about 1 to about 99 wt.% of a dicyclopentadiene polyester resin; and wherein the cured thermoset exhibits a single glass-transition temperature within the range of about 70° C. to about 150° C.

2. The thermoset of claim 1 wherein the vinyl aromatic monomer is styrene.

3. The thermoset of claim 1 wherein the polymer blend comprises from about 25 to about 75 wt.% of the unsaturated polyetherester resin and from about 25 to about 75 wt.% of the dicyclopentadiene polyester resin.

4. The thermoset of claim 1 wherein the unsaturated polyetherester resin is prepared by reacting a polyether polyol and an anhydride or a dicarboxylic acid in the presence of a catalyst effective to promote random insertion of the anhydride or dicarboxylic acid into the polyether polyol chain to produce the unsaturated polyetherester resin.

5. The thermoset of claim 1 having a tensile stress at break greater than about 7 kpsi, and a flex stress at break greater than about 12 kpsi.

6. The thermoset of claim 1 which further includes one or more additives selected from the group consisting of organic fibers, fire retardants, pigments, colorants, mold release agents, inert fillers, low-profile or low-shrink additives, and thickeners.

7. A glass-reinforced thermoset composite of claim 1.

8. A cured thermoset which comprises the reaction product of:

(a) from about 30 to about 90 wt.% of a polymer blend;

(b) from about 10 to about 70 wt.% of a vinyl aromatic monomer, both ranges based on the amount of cured thermoset; and (c) a free-radical initiator; wherein the polymer blend comprises a single phase and contains from about 1 to about 99 wt.% of an unsaturated polyetherester resin; and from about 1 to about 99 wt.% of a dicyclopentadiene polyester resin; and wherein the cured thermoset exhibits a single glass-transition temperature within the range of about 70° C. to about 150° C.

9. The thermoset of claim 8 wherein the polymer blend comprises from about 25 to about 75 wt.% of the unsaturated polyetherester resin, and from about 25 to about 75 wt.% of the dicyclopentadiene polyester resin.

10. The thermoset of claim 8 wherein the vinyl aromatic monomer is styrene.

11. The thermoset of claim 8 having a tensile stress at break greater than about 7 kpsi, and a flex stress at break greater than about 12 kpsi.

12. The thermoset of claim 8 wherein the unsaturated polyetherester resin is prepared by reacting a polyether polyol and an anhydride or a dicarboxylic acid in the presence of a catalyst effective to promote random insertion of the anhydride or dicarboxylic acid into the polyether polyol chain to produce the unsaturated polyetherester resin.

13. The thermoset of claim 8 which further includes one or more additives selected from the group consisting of organic fibers, fire retardants, pigments, colorants, mold release agents, inert fillers, low-profile or low-shrink additives, and thickeners.

14. A glass-reinforced thermoset composite of claim 8.

15. A cured thermoset which comprises the reaction product of:

(a) from about 50 to about 70 wt.% of a polymer blend;

(b) from about 30 to about 50 wt.% of styrene, both ranges based on the amount of cured thermoset; and (c) a peroxide initiator;

wherein the polymer blend comprises from about 25 to about 75 wt.% of an unsaturated polyetherester resin; and from about 25 to about 75 wt.% of a dicyclopentadiene polyester resin; and wherein the cured thermoset exhibits a single glass-transition temperature within the range of about 70° C. to about 150° C.

16. The thermoset of claim 15 wherein the polymer blend comprises from about 40 to about 60 wt.% of the unsaturated polyetherester resin and from about 60 to about 40 wt.% of the dicyclopentadiene polyester resin.

17. The thermoset of claim 15 having a tensile stress at break greater than about 7 kpsi and a flex stress at break greater than about 12 kpsi.

18. The thermoset of claim 15 wherein the unsaturated polyetherester resin is prepared by reacting a polyether polyol and an anhydride or a dicarboxylic acid in the presence of a catalyst effective to promote random insertion of the anhydride or dicarboxylic acid into the polyether polyol chain to produce the unsaturated polyetherester resin.

19. The thermoset of claim 15 which further includes one or more additives selected from the group consisting of organic fibers, fire retardants, pigments, colorants, mold release agents, inert fillers, low-profile or low-shrink additives, and thickeners.

20. A glass-reinforced thermoset composite of claim 15.

* * * * *